United States Patent [19]

Heuts et al.

[11] Patent Number: 4,702,978
[45] Date of Patent: Oct. 27, 1987

[54] ELECTROCHEMICAL CELL

[75] Inventors: Jacobus J. F. G. Heuts; Gerrit Frens, both of Eindhoven, Netherlands

[73] Assignee: U.S. Philips Corporation, New York, N.Y.

[21] Appl. No.: 932,058

[22] Filed: Nov. 18, 1986

[30] Foreign Application Priority Data

Jun. 26, 1986 [NL] Netherlands ......................... 8601675

[51] Int. Cl.$^4$ ............................................ H01M 4/36
[52] U.S. Cl. ..................................... 429/218; 429/60; 252/182.1; 423/647
[58] Field of Search .................. 429/218, 40, 224, 60, 429/220, 223, 221; 420/900, 455; 423/644, 647; 252/182.1, 518, 519, 521, 520

[56] References Cited

U.S. PATENT DOCUMENTS

| 3,669,745 | 6/1972 | Beccu | 429/218 X |
| 4,107,405 | 8/1978 | Percheron et al. | 429/218 |
| 4,214,043 | 7/1980 | Van Deutekom | 429/27 |
| 4,312,928 | 1/1982 | Van Deutekom | 429/27 |
| 4,487,817 | 12/1984 | Willems et al. | 429/27 |
| 4,554,152 | 11/1985 | Bogdanovic | 420/900 X |
| 4,609,599 | 9/1986 | Percheron et al. | 429/218 |

Primary Examiner—Anthony Skapars
Attorney, Agent, or Firm—Norman N. Spain

[57] ABSTRACT

The invention relates to an electrochemical cell having a negative electrode of a stable hydride-forming material, in which a high power density at a low temperature is obtained by adding from 5 to 45% by weight of LaNi$_5$ or a comparable high-capacity material having a higher plateau pressure than that of the stable hydride-forming material.

3 Claims, 1 Drawing Figure

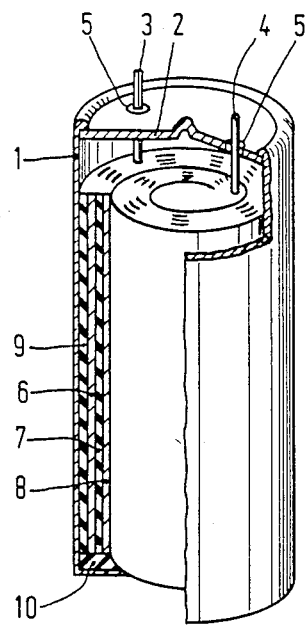

ELECTROCHEMICAL CELL

BACKGROUND OF THE INVENTION

The invention relates to an electrochemical cell comprising a negative electrode, the electrochemically active material of which consists of an intermetallic compound forming a hydride with hydrogen, which compound has the $CaCu_5$-structure and the compositional formula $AB_mC_n$, where $m+n$ is between 4.8 and 5.4, where n is between 0.05 and 0.6, in which A consists of Mischmetall or of at least one element selected from the group consisting of Y, Ti, Hf, Zr, Ca, Th, La and the remaining rare earth metals, in which the total atomic quantities of the elements Y, Ti, Hf and Zr may not be more than 40% of A, in which B consists of two or more elements selected from the group consisting of Ni, Co, Cu, Fe and Mn, the maximum atomic quantity per gram atom of A is for Ni: 3.5, for Co: 3.5, for Cu: 3.5, for Fe: 2.0 and for Mn: 1.0, and in which C consists of at least one element selected from the group consisting of Al, Cr and Si in the indicated atomic quantities: Al: 0.05–0.6, Cr: 0.05–0.5 and Si: 0.05–0.5.

The cell may be in open communication with the atmosphere or may be sealed from the atmosphere. A cell sealed from the atmosphere may have a valve which is proportioned so as to become operative at a previously fixed pressure.

In a rechargeable cell of the closed type the electrochemically active part of the positive electrode may be nickel hydroxide, silver oxide or manganese oxide, nickel hydroxide being generally preferred for practical reasons.

In the cell an electrolyte is used which generally consists of an aqueous solution of one or more alkali metal hydroxides, such as lithium hydroxide, sodium hydroxide and potassium hydroxide, having a pH exceeding 7.

The cell may furthermore comprise a separator which separates the electrodes electrically but permits transport of ions and gas. The separator may consist of synthetic resin fibres (which may or may not be woven), for example of polyamide fibres or polypropylene fibres.

Such an electrochemical cell is described in U.S. Pat. No. 4,487,817. In said Patent the electrochemically active material of the negative electrode is selected so that it is very resistant to corrosion, thereby limiting to the extent possible the deterioration of the electrochemical capacity of the cell.

A disadvantage of the electrochemical cell as described in this U.S. Patent is that the capacity of the cell in the first charge and discharge cycle is less than the maximum capacity and that during the first 20 to 30 charge and discharge cycles it increases only gradually to that maximum capacity. This phenomenon is called "activation".

A further disadvantage of the known electrochemical cell is the relatively low power density of the cell and at a low operational temperature, for example below 0° C. The expression "power density" is to be understood to mean herein the capacity of the cell at high discharge rates. Both properties previously described reduce the usefulness of the stable hydride-forming materials as described in this U.S. Patent.

SUMMARY OF THE INVENTION

It is an object of the invention to provide an electrochemical cell which can be activated rapidly, i.e. a cell which attains its maximum capacity after a small number of charge and discharge cycles.

A further object of the invention is to provide an electrochemical cell having a high power density at low operational temperatures.

This object is achieved in accordance with the invention by an electrochemical cell as described in the opening paragraph, which is further characterized in that the electrochemically active material of the negative electrode also comprises an intermetallic compound forming a hydride with hydrogen of the compositional formula $DNi_pE_q$ in an amount from 5 to 45% by weight calculated on the total amount of electrochemically active material, where $p+q$ is between 4.8 and 5.4, where p is between 3.5 and 5.4, where q has a value from 0 to 1.5, where D is selected from the group consisting of La and Mischmetall, and where E consists of one or more elements selected from the group consisting of Co, Cr, Mn and Cu.

In accordance with the invention, the electrochemically active material of the negative electrode consists of two components: a stable hydride-forming material and a high power density hydride-forming material. The high stability of the hydride-forming material as described in U.S. Pat. No. 4,487,817 is based partly on the presence of sufficient amounts of two different transition metals, such as Ni and Co, which adversely affects the capacity. The invention is based on the addition of a material which has a higher capacity and a higher plateau pressure in the hydrogen equilibrium diagram. The invention is further based on the recognition that the lower stability of the high power density material is no disadvantage because under normal operating conditions only the stable hydride-forming material is subject to electrochemical reactions. Only when the cell is occasionally used at a low temperature, which causes the capacity of the stable hydride-forming material to decrease, the high power density material is subject to electrochemical reactions. Only then the high power density material is subject to corrosion, consequently the life cycle of the electrochemical cell exceeds considerably that of a cell which only contains high power density material.

BRIEF DESCRIPTION OF THE DRAWING

The sole figure in the drawing is a partial sectional view in partial elevation of a closed rechargable electrochemical cell in accordance with the invention.

DETAILED DESCRIPTION OF THE INVENTION

In a suitable embodiment of the electrochemical cell in accordance with the invention, the high power density material is $LaNi_5$.

In a preferred embodiment of the elecrochemical cell in accordance with the invention, the intermetallic compounds of the compositional formulas $AB_mC_n$ and $DNi_pE_q$ are mixed in the form of granular materials.

Preferably, an electrochemical cell is used with a negative electrode which has a higher electrochemical capacity than the positive electrode, which cell is further characterized in accordance with the invention in that the amount of the intermetallic compounds of the compositional formula $DNi_pE_q$ is selected so that the electrochemical capacity thereof is smaller than or equal to the surplus capacity of the negative electrode. The use of an electrochemical cell in which the negative electrode has a surplus capacity is described in U.S. Pat. No. 4,312,928.

The invention will be described in more detail with reference to an exemplary embodiment and a comparative example, and with reference to the drawing.

Example of a rechargeable cell construction.

A cell sealed from the air as shown in the figure of the drawing is formed of a suitable housing 1 of metal, for example stainless steel, having a cover 2 comprising apertures for the conductors 3 and 4. The conductors are insulated from the metal housing (1,2) by means of rings 5 of synthetic resin. The outside diameter of the housing may be, for example, 22 mm and its height 41 mm. Inside the housing an assembly formed of a roll of a negative electrode 6, a separator 7 and a positive electrode 8 is provided, while the assembly is surrounded by an electrically insulating foil 9 of synthetic resin, for example polyvinyl chloride, and is supported by a disc 10 of an electrically insulating material, such as polyvinyl chloride.

The negative electrode 6 consists of a mixture of hydride-forming intermetallic compounds, as previously described, and is connected to the conductor 3. The negative electrode 6 is manufactured by fusing suitable quantities of the relevant elements, pulverizing the intermetallic compounds thus formed, mixing them and applying them to a nickel carrier, for example, by means of a polymeric binder, such as polyvinyl alcohol.

The positive electrode 8 is a nickel hydroxide electrode of the conventional sintered type which is connected to the conductor 4. A 6 N potassium hydroxide solution in water is used as an electrolyte. The electrolyte is absorbed in the separator 7 and is in wetting contact with the electrochemically active material of the two electrodes. The separator 7 consists of a nonwoven membrane of polyamide fibres.

The free gas space in the cell is approximately 5 cm$^3$. A closed cell of this type has an EMF between 1.2 and 1.4 V. The cells in accordance with the invention can be combined in a conventional manner to form batteries comprising, for example, several series-arranged cells.

Example according to the invention.

An electrochemically active material of the negative electrode, having the composition $La_{0.8}Nd_{0.2}Ni_{2.5}Co_{2.4}Si_{0.1}$, is prepared by mixing the required quantities of the various components, and subsequently fusing and pulverizing them by repeated hydrogen adsorption and desorption. An electrochemically active material of the composition $LaNi_{5.0}$ is prepared in the same way. An electrode is then made and accommodated in a cell, for example as previously described, a mixture of electrochemically active materials being used consisting of 30% by weight of $LaNi_{5.0}$ and 70% by weight of $La_{0.8}Nd_{0.2}Ni_{2.5}Co_{2.4}Si_{0.1}$. In accordance with the exemplary embodiment, the electrochemical capacity of the negative electrode exceeds that of the positive electrode by 50%.

The power density of the negative electrode is determined by measuring the storage capacity of the cell in charge and discharge cycles at a rate of 2.0 C, i.e. the charge and discharge speed is such that 2.0 times the nominal capacity of the cell would be supplied to or withdrawn from the cell in 1 hour. The nominal capacity of the cell is the capacity at a low charge and discharge speed, measured before the capacity of the cell deteriorates, for example, as a consequence of corrosion.

After 10 charge and discharge cycles the power density is 90% of the maximum capacity, after 20 cycles.

In 400 charge and discharge cycles it was established that the storage capacity of the negative electrode decreases with approximately 0.04% per cycle due to corrosion and disintegration of the electrochemically active material when the cell is used at 25° C.. As the electrochemical capacity of the stable compound $La_{0.8}Nd_{0.2}Ni_{2.5}Co_{2.4}Si_{0.1}$ is higher than that of the electrochemically active material of the positive electrode and because the hydrogen equilibrium pressure is lower than that of $LaNi_{5.0}$, $LaNi_{5.0}$ does not take part in the electrochemical reactions under normal conditions.

When the cell is used at 0° C. the capacity of the stable material decreases, causing $LaNi_{5.0}$ to take part in the electrochemical reactions, and hence to be partially charged. The capacity of the negative electrode at 0° C. is 85% of the capacity at 25° C., even if the cell is discharged at a rate of 4.5 C. The storage capacity of the negative electrode decreases at 0° C. with approximately 0.13% per cycle, because now adsorption and desorption of hydrogen also takes place in the less stable $LaNi_{5.0}$, thereby accelerating corrosion.

Comparable results are attained by replacing $LaNi_{5.0}$ by $LaNi_{4.0}Cu_{1.0}$ or $LaNi_{4.0}Co_{1.0}$ which are also high-capacity compounds. Mischmetall may be used instead of La in the high power density compound. Example for comparison, not in accordance with the invention.

An electrochemical cell is manufactured as previously described, using an active material for the negative electrode which consists entirely of $La_{0.8}Nd_{0.2}Ni_{2.5}Co_{2.4}Si_{0.1}$.

The capacity of the negative electrode at a charge and discharge rate of 2.0 C and at 0° C. is only 55% of the capacity at 25° C. and decreases further to 35% if the discharge rate is raised to 4.5 C. The decrease of the storage capacity due to corrosion amounts to about 0.03% per cycle both at 0° C. and at 25° C. after 350 charge and discharge cycles.

What is claimed is:

1. An electrochemical cell comprising a negative electrode, the electrochemically active material of which consists of an intermetallic compound forming a hydride with hydrogen, which compound has the $CaCu_5$-structure and the compositional formula $AB_mC_n$, where $m+n$ is between 4.8 and 5.4, where n is between 0.05 and 0.6, in which A consists of Mischmetall or of at least one element selected from the group consisting of Y, Ti, Hf, Zr, Ca, Th, La and the remaining rare earth metals, in which the total atomic quantities of the elements Y, Ti, Hf and Zr may not be more than 40% of A, in which B consists of two or more elements selected from the group consisting of Ni, Co, Cu, Fe and Mn, the maximum atomic quantity per gram atom of A is being for Ni: 3.5, for Co: 3.5, for Cu: 3.5, for Fe: 2.0 and for Mn: 1.0, and in which C consists of of at least one element selected from the group consisting of Al, Cr and Si in the following atomic quantities: Al: 0.05–0.6, Cr: 0.05–0.5 and Si: 0.05–0.5, characterized in that the electrochemically active material of the negative electrode also comprises an intermetallic compound forming a hydride with hydrogen, of the compositional formula $DN_{ihd}pE_q$ in an amount from 5 to 45% by weight calculated on the total amount of electrochemically active material, where $p+q$ is between 4.8 and 5.4, where p is between 3.5 and 5.4, where q has a value from 0 to 1.5, where D is selected from the group formed by La and Mischmetall, and where E consists of one or more elements selected from the group consisting of Co, Cr, Mn and Cu.

2. An electrochemical cell as claimed in claim 1, characterized in that the intermetallic compounds of the compositional formulas $Ab_mC_n$ and $DNi_pE_q$ are mixed in the form of granular materials.

3. An electrochemical cell as claimed in claim 1, in which the negative electrode has a higher electrochemical capacity than the positive electrode, characterized in that the amount of the intermetallic compound of the compositional formula $DNi_qE_q$ is selected so that the electrochemical capacity thereof is smaller than or equal to the surplus capacity of the negative electrode.

* * * * *

UNITED STATES PATENT AND TRADEMARK OFFICE
CERTIFICATE OF CORRECTION

PATENT NO. : 4,702,978

DATED : October 27, 1987

INVENTOR(S) : Jacobus J.F.G. Heuts et al

It is certified that error appears in the above-identified patent and that said Letters Patent is hereby corrected as shown below:

Claim 1, line 23    change "DNihd pEq" to --$DNi_pE_q$--

Claim 2, line 3    change "$Ab_mC_n$" to --$AB_mC_n$--

Claim 3, line 5    change "$DNi_qE_q$" to --$DNi_pE_q$--

Signed and Sealed this

Twenty-fifth Day of October, 1988

*Attest:*

DONALD J. QUIGG

*Attesting Officer*    *Commissioner of Patents and Trademarks*